(12) United States Patent
Uchida

(10) Patent No.: US 11,062,434 B2
(45) Date of Patent: Jul. 13, 2021

(54) METHOD OF GENERATING ELEMENTAL MAP AND SURFACE ANALYZER

(71) Applicant: JEOL Ltd., Tokyo (JP)

(72) Inventor: Tatsuya Uchida, Tokyo (JP)

(73) Assignee: JEOL Ltd., Tokyo (JP)

( * ) Notice: Subject to any disclaimer, the term of this patent is extended or adjusted under 35 U.S.C. 154(b) by 79 days.

(21) Appl. No.: 16/590,706

(22) Filed: Oct. 2, 2019

(65) Prior Publication Data

US 2020/0111197 A1    Apr. 9, 2020

(30) Foreign Application Priority Data

Oct. 5, 2018 (JP) .............................. JP2018-189983

(51) Int. Cl.
*G06T 5/00* (2006.01)
*G01N 23/2273* (2018.01)
(Continued)

(52) U.S. Cl.
CPC ......... *G06T 5/009* (2013.01); *G01N 23/2273* (2013.01); *G01N 23/2276* (2013.01);
(Continued)

(58) Field of Classification Search
CPC .. G06T 5/009; G06T 5/50; G06T 7/40; G06T 2207/10061; G01N 23/2273; G01N 23/2276; G01N 2223/401
See application file for complete search history.

(56) References Cited

U.S. PATENT DOCUMENTS 6,528,787 B2 * 3/2003 Katagami ............... H01J 37/28
  250/310
6,584,413 B1 * 6/2003 Keenan .................... G01J 3/28
  702/194
(Continued)

FOREIGN PATENT DOCUMENTS

JP    2017111022 A    6/2017

OTHER PUBLICATIONS

Tanaka et al., Graphene imagine using REELS spectra by Auger electron spectroscopy, Proceedings of the 2018 IEEE International Symposium on the Physical and Failure Analysis of Integrated Circuits (IPFA), Jul. 16, 2018, pp. 1-4.
(Continued)

*Primary Examiner* — Gregory M Desire
(74) *Attorney, Agent, or Firm* — The Webb Law Firm

(57) ABSTRACT

A method of generating an elemental map includes: acquiring a plurality of correction channel images by scanning a surface of a standard specimen having a uniform elemental concentration with a primary beam and generating a correction channel image for each channel; generating correction information for each pixel of each correction channel image among the plurality of correction channel images based on a brightness value of the pixel; acquiring a plurality of analysis channel images by scanning a surface of a specimen to be analyzed with the primary beam and generating an analysis channel image for each channel; correcting brightness values of pixels constituting an analysis channel image among the plurality of analysis channel images based on the correction information; and generating an elemental map of the specimen to be analyzed based on the plurality of analysis channel images having pixels with corrected brightness values.

8 Claims, 11 Drawing Sheets

(51) Int. Cl.
*G01N 23/2276* (2018.01)
*G06T 5/50* (2006.01)
*G06T 7/40* (2017.01)

(52) U.S. Cl.
CPC .................. *G06T 5/50* (2013.01); *G06T 7/40* (2013.01); *G01N 2223/401* (2013.01); *G06T 2207/10061* (2013.01)

(56) References Cited

U.S. PATENT DOCUMENTS

| | | | | |
|---|---|---|---|---|
| 6,675,106 | B1* | 1/2004 | Keenan | G01J 3/28 |
| | | | | 702/194 |
| 7,544,935 | B2* | 6/2009 | Terada | G01B 15/02 |
| | | | | 250/306 |
| 8,134,698 | B1* | 3/2012 | Wolters | G01N 21/9501 |
| | | | | 356/237.1 |
| 8,362,426 | B2* | 1/2013 | Kobaru | H01J 37/244 |
| | | | | 250/310 |
| 8,748,816 | B2* | 6/2014 | Kooijman | G01N 23/2206 |
| | | | | 250/310 |
| 9,312,099 | B2* | 4/2016 | Obara | H01J 37/28 |
| 2019/0035601 | A1* | 1/2019 | Budach | H01J 37/04 |

OTHER PUBLICATIONS

Walker, et al.. Quantifying Data from Auger Spectra and Images, Surface and Interface Analysis, vol. 11, No. 5, Mar. 1, 1988, pp. 266-278.
Extended European Search Report issued in EP19201511.3 dated Mar. 19, 2020.

* cited by examiner

METHOD OF GENERATING ELEMENTAL MAP AND SURFACE ANALYZER

CROSS-REFERENCE TO RELATED APPLICATION

This application claims priority to Japanese Patent Application No. 2018-189983 filed Oct. 5, 2018, the disclosure of which is hereby incorporated by reference in its entirety.

BACKGROUND OF THE INVENTION

Field of the Invention

The present invention relates to a method of generating an elemental map and to a surface analyzer.

Description of Related Art

As surface analyzers, an Auger electron microscope (AES) and an X-ray photoelectron spectroscope (XPS) are well known (for example, refer to JP-A-2017-111022). With such a surface analyzer, an elemental map indicating a distribution of desired elements can be acquired.

For example, with an Auger electron microscope, an elemental map (an Auger map) can be acquired by irradiating each measurement point on a specimen surface with an electron beam to scan the measurement point with the electron beam and detecting Auger electrons emitted from each measurement point.

With an Auger electron microscope, analyzed Auger electrons are detected by a detector having a plurality of channels capable of detecting electrons with different energies in a mutually independent manner. As such a detector, a detector equipped with a plurality of channeltrons is known.

Sensitivity of the detector described above is dependent on a position of a light source or, in other words, a position of a measurement point that is a generation source of Auger electrons. Therefore, in some cases, when acquiring an elemental map, the sensitivity of the detector changes at each measurement point and creates a variation in brightness on the elemental map. In particular, a positional dependence of the sensitivity of the detector has a significant impact in low-magnification measurement.

SUMMARY OF THE INVENTION

According to a first aspect of the invention, there is provided a method of generating an elemental map in a surface analyzer which acquires an elemental map by scanning a surface of a specimen with a primary beam, separating signals emitted from the specimen with a spectrometer, and detecting the separated signals with a detector having a plurality of channels capable of detecting the signals having energies that differ from one another, the method of generating an elemental map including:

acquiring a plurality of correction channel images by scanning a surface of a standard specimen having a uniform elemental concentration with the primary beam and generating a correction channel image for each of the channels;

generating correction information for each pixel of each correction channel image among the plurality of correction channel images based on a brightness value of the pixel;

acquiring a plurality of analysis channel images by scanning a surface of a specimen to be analyzed with the primary beam and generating an analysis channel image for each of the channels;

correcting brightness values of pixels constituting an analysis channel image among the plurality of analysis channel images based on the correction information; and generating the elemental map of the specimen to be analyzed based on the plurality of analysis channel images having the pixels with corrected brightness values.

According to a second aspect of the invention, there is provided a surface analyzer including:

a scanning unit which scans a surface of a specimen with a primary beam;

a spectrometer which separates signals emitted from the specimen;

a detector which detects the signals separated by the spectrometer with a plurality of channels capable of detecting the signals having energies that differ from one another; and an image processing unit which generates an elemental map, the image processing unit performing the processes of:

acquiring a plurality of analysis channel images obtained by scanning a surface of a specimen to be analyzed with the primary beam;

correcting brightness values of pixels constituting an analysis channel image among the plurality of analysis channel images based on correction information which corrects a positional dependence of sensitivity of the detector; and generating the elemental map of the specimen to be analyzed based on the plurality of analysis channel images having the pixels with corrected brightness values.

DESCRIPTION OF THE INVENTION

Figure 1:
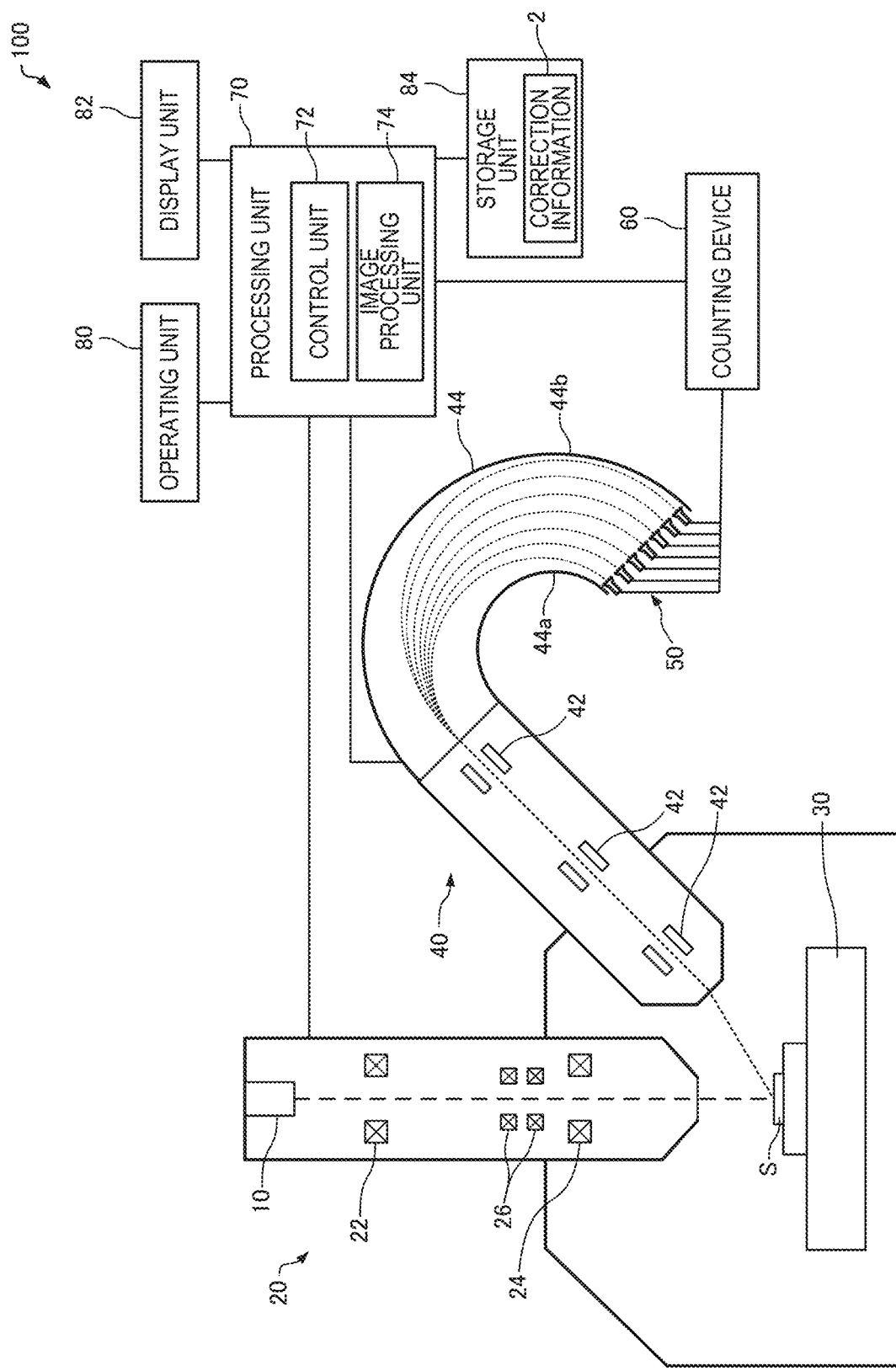
FIG. 1 is a diagram illustrating a configuration of a surface analyzer according to an embodiment of the invention.

According to an embodiment of the invention, there is provided a method of generating an elemental map in a surface analyzer which acquires an elemental map by scanning a surface of a specimen with a primary beam, separating signals emitted from the specimen with a spectrometer, and detecting the separated signals with a detector having a plurality of channels capable of detecting the signals having energies that differ from one another, the method of generating an elemental map including:

acquiring a plurality of correction channel images by scanning a surface of a standard specimen having a uniform elemental concentration with the primary beam and generating a correction channel image for each of the channels;

generating correction information for each pixel of each correction channel image among the plurality of correction channel images based on a brightness value of the pixel;

acquiring a plurality of analysis channel images by scanning a surface of a specimen to be analyzed with the primary beam and generating an analysis channel image for each of the channels;

correcting brightness values of pixels constituting an analysis channel image among the plurality of analysis channel images based on the correction information; and generating the elemental map of the specimen to be analyzed based on the plurality of analysis channel images having the pixels with corrected brightness values.

With such a method of generating an elemental map, since an elemental map is generated by correcting brightness values of pixels constituting an analysis channel image based on the correction information, an elemental map in which variation in brightness attributable to a positional dependence of sensitivity of the detector is reduced can be generated.

According to an embodiment of the invention, there is provided a surface analyzer including:

a scanning unit which scans a surface of a specimen with a primary beam;

a spectrometer which separates signals emitted from the specimen;

a detector which detects the signals separated by the spectrometer with a plurality of channels capable of detecting the signals having energies that differ from one another; and an image processing unit which generates an elemental map, the image processing unit performing the processes of:

acquiring a plurality of analysis channel images obtained by scanning a surface of a specimen to be analyzed with the primary beam;

correcting brightness values of pixels constituting an analysis channel image among the plurality of analysis channel images based on correction information which corrects a positional dependence of sensitivity of the detector; and generating the elemental map of the specimen to be analyzed based on the plurality of analysis channel images having the pixels with corrected brightness values.

With such a surface analyzer, since an elemental map is generated by correcting brightness values of pixels constituting an analysis channel image based on the correction information, an elemental map in which variation in brightness attributable to a positional dependence of sensitivity of the detector is reduced can be generated.

Embodiments of the invention are described in detail below with reference to the drawings. Note that the following embodiments do not unduly limit the scope of the invention as stated in the claims. In addition, all of the elements described below are not necessarily essential requirements of the invention.

1. Surface Analyzer 1.1. Configuration of Surface Analyzer

First, a surface analyzer according to an embodiment of the invention will be described with reference to the drawings. FIG. 1 is a diagram illustrating a configuration of a surface analyzer 100 according to an embodiment of the invention.

The surface analyzer 100 is an apparatus for analyzing a specimen S using Auger electron spectroscopy. Auger electron spectroscopy refers to a method of elemental analysis which is performed by measuring energy of Auger electrons excited by an electron beam or the like and emitted from the specimen S.

With the surface analyzer 100, an elemental map (an Auger map) indicating a distribution of elements can be acquired. Specifically, the surface analyzer 100 acquires an elemental map by scanning a surface of the specimen S with an electron beam, analyzing Auger electrons emitted from the specimen S with a spectrometer 40, and detecting the analyzed Auger electrons with a detector 50 having a plurality of channels capable of detecting electrons with energies that differ from one another.

As illustrated in FIG. 1, the surface analyzer 100 includes an electron source 10, an optical system 20, a specimen stage 30, the spectrometer 40, the detector 50, a counting device 60, a processing unit 70, an operating unit 80, a display unit 82, and a storage unit 84.

The electron source 10 generates an electron beam. The electron source 10 is, for example, an electron gun which accelerates electrons emitted from a cathode by an anode and which emits an electron beam.

The optical system 20 irradiates a specimen S with an electron beam emitted from the electron source 10. The optical system 20 is configured so as to include a condenser lens 22, an objective lens 24, and a deflector 26 as an example of the scanning unit.

The condenser lens 22 and the objective lens 24 focus an electron beam discharged from the electron source 10. An electron probe can be formed by focusing an electron beam emitted from the electron source 10 with the condenser lens 22 and the objective lens 24.

The deflector 26 deflects the electron probe focused by the condenser lens 22 and the objective lens 24. The deflector 26 is used in order to scan an electron beam over a surface of the specimen S.

The specimen stage 30 holds the specimen S. The specimen stage 30 is equipped with a horizontal direction moving mechanism which moves the specimen S in a horizontal direction, a height direction moving mechanism which moves the specimen S in a height direction, and a tilting mechanism which tilts the specimen S. The specimen S can be positioned by the specimen stage 30.

The spectrometer 40 analyzes Auger electrons generated by the specimen S when the specimen S is irradiated with an electron beam. The spectrometer 40 is configured so as to include an input lens 42 and a hemispherical electrostatic analyzer 44.

The input lens 42 guides incident electrons to the hemispherical electrostatic analyzer 44. In addition, the input lens 42 makes energy resolution variable by decelerating the electrons. In the input lens 42, although the greater the deceleration of the electrons, the higher the resolution, sensitivity decreases.

The hemispherical electrostatic analyzer 44 has a hemispherical inner electrode 44a and a hemispherical outer electrode 44b. In the hemispherical electrostatic analyzer 44, by applying voltage between the hemispherical inner electrode 44a and the hemispherical outer electrode 44b, electrons in an energy range in accordance with the applied voltage can be collected.

The detector 50 detects electrons analyzed by the spectrometer 40. The detector 50 has a plurality of channels capable of independently detecting electrons with energies that differ from one another.

Figure 2:
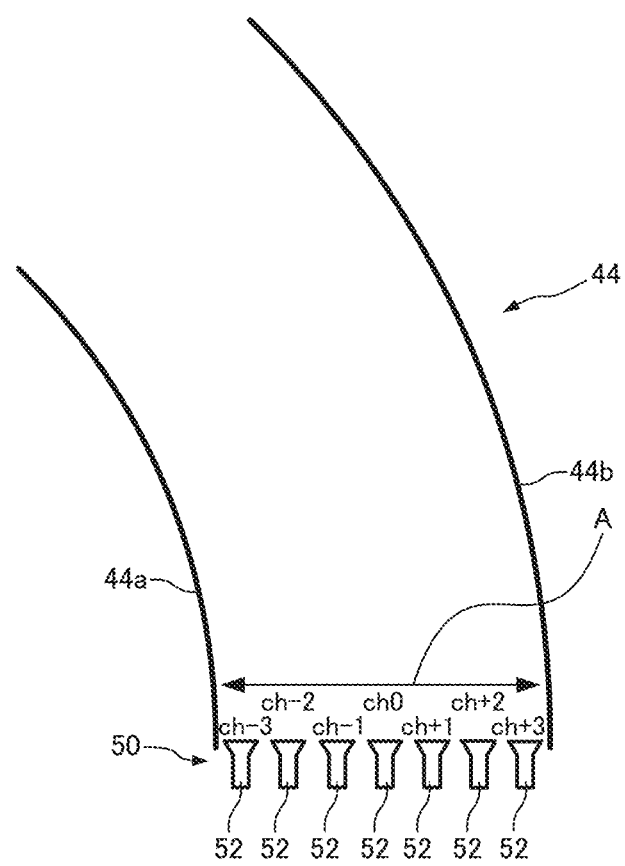
FIG. 2 is a diagram schematically illustrating a detector.

FIG. 2 is a diagram schematically illustrating the detector 50. The detector 50 is configured so as to include a plurality of channeltrons 52. The plurality of channeltrons 52 constitute a plurality of channels capable of independently detecting electrons with energies that differ from one another.

While the detector 50 has seven channeltrons 52 in the example illustrated in FIG. 2, the number of channeltrons 52 is not particularly limited. The channeltrons 52 detect electrons and output an amplified signal.

The plurality of channeltrons 52 are arranged side by side in an energy dispersion direction A of electrons on an exit plane of the spectrometer 40 or, in other words, on an energy dispersion surface. Therefore, the plurality of channeltrons 52 are capable of independently detecting electrons with energies that differ from one another. Accordingly, the detector 50 is capable of simultaneously detecting electrons with energies that differ from one another.

The plurality of channeltrons 52 are assigned channel numbers. Specifically, ch0 is assigned to the channeltron 52 which detects electrons passing a center between the hemispherical inner electrode 44a and the hemispherical outer electrode 44b. In addition, channel ch−1, channel ch−2, and channel ch−3 are respectively assigned to the three channeltrons 52 sequentially arranged toward the side of the hemispherical inner electrode 44a from the ch0 channeltron 52. Furthermore, channel ch+1, channel ch+2, and channel ch+3 are respectively assigned to the three channeltrons 52 sequentially arranged toward the side of the hemispherical outer electrode 44b from the ch0 channeltron 52.

The plurality of channeltrons 52 are arranged so that an energy interval $\Delta E$ between adjacent channeltrons 52 is the same. Therefore, when energy that can be detected by the ch0 channeltron 52 is denoted by E, energy that can be detected by the ch−1 channeltron 52 is denoted by E−$\Delta E$, energy that can be detected by the ch−2 channeltron 52 is denoted by E−2×$\Delta E$, and energy that can be detected by the ch−3 channeltron 52 is denoted by E−3×$\Delta E$. In addition, energy that can be detected by the ch+1 channeltron 52 is denoted by E+$\Delta E$, energy that can be detected by the ch+2 channeltron 52 is denoted by E+2×$\Delta E$, and energy that can be detected by the ch+3 channeltron 52 is denoted by E+3×$\Delta E$.

The operating unit 80 performs a process of converting an instruction from a user into a signal and sending the signal to the processing unit 70. For example, the operating unit 80 can be realized by an input device such as a button, a key, a touch panel display, or a microphone.

The display unit 82 displays an image generated by the processing unit 70. The display unit 82 can be realized by a display such as a liquid crystal display (LCD).

The storage unit 84 stores programs and data which enable the processing unit 70 to perform various calculation processes and control processes. In addition, the storage unit 84 is also used as a work area of the processing unit 70. The storage unit 84 can be realized by, for example, a random access memory (RAM), a read only memory (ROM), and a hard disk. Correction information 2 is stored in the storage unit 84. A description of the correction information 2 will be provided later.

The processing unit 70 performs processes including processes for controlling the respective parts constituting the surface analyzer 100 and a process of generating an elemental map. Functions of the processing unit 70 can be realized by having various processors (a central processing unit (CPU) and the like) execute programs. It should be noted that at least part of the functions of the processing unit 70 may be realized by a dedicated circuit such as an ASIC (a gate array or the like). The processing unit 70 includes a control unit 72 and an image processing unit 74.

The control unit 72 controls the optical system 20 so that, for example, an electron beam is scanned in a desired region on a surface of the specimen S. In addition, the control unit 72 controls the optical system 20 and the spectrometer 40 in order to perform a measurement (for example, an elemental mapping) of the specimen S.

The image processing unit 74 performs a process of generating an elemental map. Details of the process by the image processing unit 74 will be described later in "3. Processes".

The counting device 60 counts electrons detected by the channeltrons 52. The counting device 60 counts detected electrons for each of the plurality of channeltrons 52. The counting device 60 receives output signals of the plurality of channeltrons 52 and counts electrons for each energy. The counting device 60 sends a count result of electrons for each energy to the processing unit 70. A count result is, for example, a count rate. A count rate represents the number of electrons counted within a unit time.

1.2. Operations of Surface Analyzer

Next, operations of the surface analyzer 100 will be described. Hereinafter, a case where an elemental mapping is performed in the surface analyzer 100 will be described.

An electron beam discharged from the electron source 10 is focused by the condenser lens 22 and the objective lens 24 and irradiates the specimen S. At this point, the electron beam is scanned over a surface of the specimen S by using the deflector 26. Auger electrons, secondary electrons, backscattered electrons, and the like are discharged from a measurement point of the specimen S irradiated by the electron beam.

The Auger electrons and the like discharged from the specimen S are incident into and decelerated by the input lens 42. The decelerated Auger electrons are analyzed by the hemispherical electrostatic analyzer 44 and, as illustrated in FIG. 2, dispersed in accordance with energy in the energy dispersion direction A on an exit plane of the hemispherical electrostatic analyzer 44.

The Auger electrons dispersed in accordance with energy are detected by the plurality of channeltrons 52 arranged side by side in the energy dispersion direction A. The electrons detected by the plurality of channeltrons 52 are counted by the counting device 60 for each channeltron 52 and a count result thereof is sent to the processing unit 70.

In the processing unit 70, based on the count result for each channeltron 52, a channel image is generated for each channeltron 52. Since the detector 50 has seven channeltrons 52 in the example illustrated in FIG. 2, seven channel images are generated. In the processing unit 70, an elemental map is generated based on the channel image generated for each channeltron 52 (in the example illustrated in FIG. 2, seven channel images). A method of generating the elemental map will be described later in "2. Method of generating elemental map".

In this case, as described earlier, not only Auger electrons but secondary electrons, backscattered electrons, and the like are also discharged from the specimen S when irradiated by an electron beam. Since a signal discharged from the specimen S includes Auger electrons as well as other electrons in this manner, a signal (an Auger peak) due to the Auger electrons must be separated from signals (background) of other electrons.

Methods of separating the background include a method of performing two measurements (hereinafter, also referred to as "PB separate measurement") and a method of performing one measurement (hereinafter, also referred to as "PB simultaneous measurement").

In PB separate measurement, first, a measurement (a mapping) of an Auger peak corresponding to a desired element is performed to acquire a map (hereinafter, also referred to as a "peak map"). Next, a measurement (a mapping) of the background is performed in a vicinity of the Auger peak corresponding to the desired element to acquire a map (hereinafter, also referred to as a "background map"). The background can be removed from the peak map by subtracting the background map from the peak map. In this manner, an elemental map (an Auger map) is obtained.

In PB simultaneous measurement, by using a plurality of channeltrons 52, a measurement of an Auger peak and a measurement of a background in the vicinity of the Auger peak are simultaneously performed. Accordingly, in PB simultaneous measurement, a peak map and a background map are obtained by one measurement. Therefore, in PB simultaneous measurement, an elemental map can be obtained in an efficient manner.

2. Method of Generating Elemental Map

Figure 3:
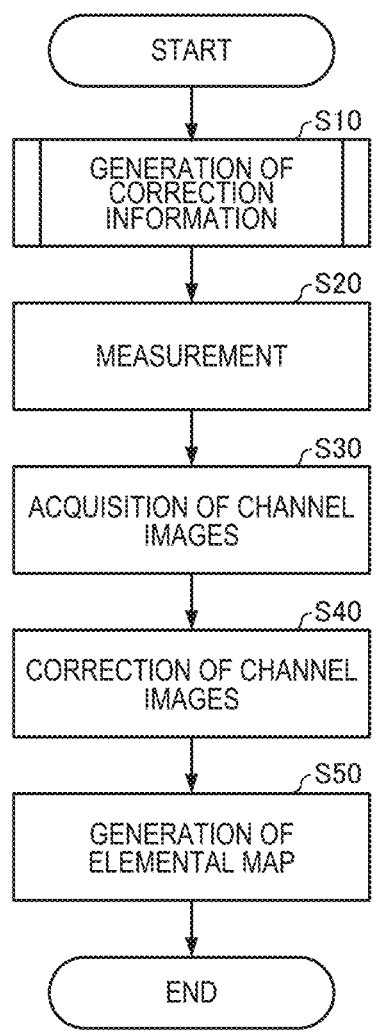
FIG. 3 is a flowchart illustrating an example of a method of generating an elemental map according to an embodiment of the invention.

Next, a method of generating an elemental map according to an embodiment of the invention will be described with reference to the drawings. FIG. 3 is a flowchart illustrating an example of the method of generating an elemental map according to an embodiment of the invention.

2.1. Generation of Correction Information (S10)

First, correction information 2 for correcting brightness of an elemental map is generated. In this case, sensitivity of the detector 50 is dependent on a position of a measurement point on the surface of the specimen S. The correction information 2 is information for correcting a positional dependence of the sensitivity of the detector 50.

Figure 4:
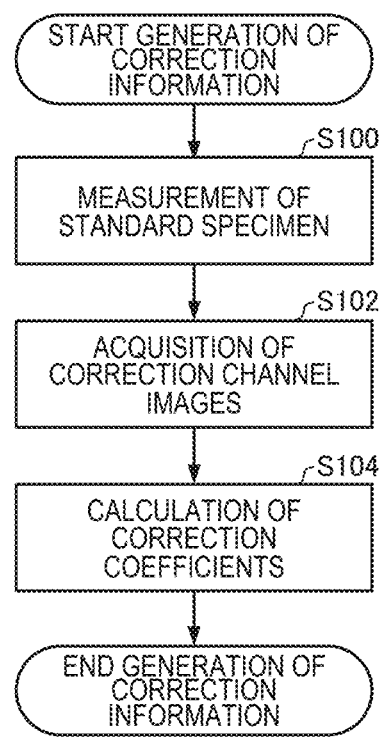
FIG. 4 is a flow chart illustrating an example of a process of generating correction information.

FIG. 4 is a flow chart illustrating an example of a process of generating the correction information 2.

(1) Measurement of Standard Specimen (S100)

As the standard specimen, when the sensitivity of the detector 50 is not positionally dependent, a specimen is used from which an elemental map with uniform brightness is obtained. Specifically, the standard specimen is a specimen having uniform elemental concentration. In addition, the standard specimen is preferably flat. Examples of such a standard specimen include semiconductor wafers such as a silicon wafer. Performing an elemental mapping of the standard specimen enables an elemental map with uniform brightness to be obtained when the sensitivity of the detector 50 is not positionally dependent. The measurement of the standard specimen is performed by, for example, PB simultaneous measurement.

(2) Acquisition of Correction Channel Image (S102)

By measuring the standard specimen, in the processing unit 70, a correction channel image is generated for each channeltron 52. Accordingly, the processing unit 70 (the image processing unit 74) can acquire seven correction channel images.

Figure 5:
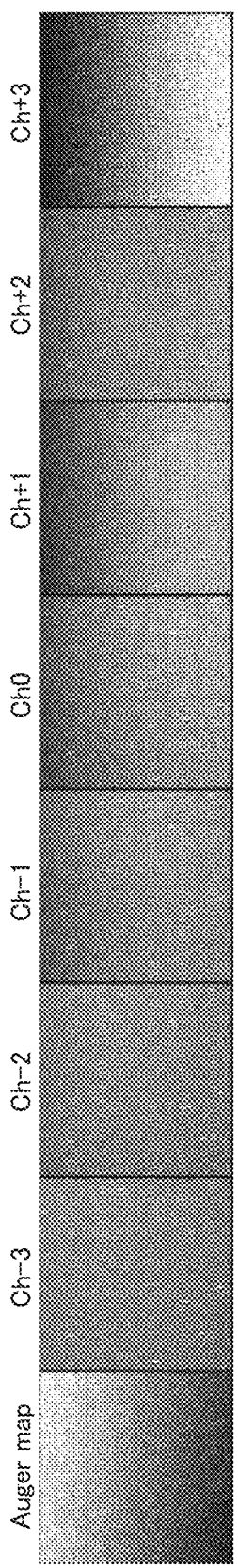
FIG. 5 illustrates correction channel images and an elemental map obtained by measuring a standard specimen.

FIG. 5 illustrates correction channel images and an elemental map (an Auger map) obtained by measuring a standard specimen. The correction channel images in FIG. 5 are images obtained by PB simultaneous measurement.

As illustrated in FIG. 5, in the surface analyzer 100, seven channel images are obtained in correspondence to the seven channeltrons 52. For example, a channel image of ch0 is an image indicating a distribution of intensities (count rates) of electrons obtained by detecting, with the ch0 channeltron 52, electrons discharged from the standard specimen when an electron beam is scanned over a surface of the standard specimen. A brightness value of a pixel constituting a channel image corresponds to an intensity (a count rate) of electrons at a measurement point corresponding to the pixel. The seven channel images are images obtained by detecting electrons with energies that differ from one another.

An elemental map (an Auger map) is generated based on a plurality of correction channel images. For example, a brightness value of a pixel constituting a channel image is represented by $A_{ch}(x,y,ch)$, where x denotes a pixel number in a horizontal direction of the channel image, y denotes a pixel number in a vertical direction of the channel image, and ch denotes a channel number. When generating an elemental map based on the seven channel images in FIG. 5, a brightness value $A_{map}(x,y)$ of an image constituting the elemental map is represented by the following equation.

$$A_{map}(x,y) = F(A_{ch}(x,y,-3), A_{ch}(x,y,-2), A_{ch}(x,y,-1),$$
$$A_{ch}(x,y,0), A_{ch}(x,y,+1), A_{ch}(x,y,+2), A_{ch}(x,y,+3))$$

As used herein, F denotes a function of calculating an elemental map from a plurality of channel images during PB simultaneous measurement.

As illustrated in FIG. 5, the elemental map (the Auger map) exhibits a variation in brightness. Since the standard specimen is a specimen from which an elemental map with uniform brightness is obtained, the variation in brightness is attributable to the surface analyzer 100.

In this case, the effect of a positional dependence of the sensitivity of the detector 50 is manifested in brightness of the elemental map regardless of whether PB separate measurement or PB simultaneous measurement is performed.

In addition, in PB separate measurement, since a measurement of an Auger peak and a measurement of a background can be performed with the same channeltron 52, an individual difference among a plurality of channeltrons 52 does not affect the brightness of the elemental map. On the other hand, in PB simultaneous measurement, since a plurality of channeltrons 52 measure electrons with energies that differ from one another, an individual difference among the plurality of channeltrons 52 affects the brightness of the elemental map.

In this manner, in PB simultaneous measurement, an effect of the positional dependence of the sensitivity of the detector 50 and an effect of the individual difference among the plurality of channeltrons 52 are manifested on the elemental map as variations in brightness.

(3) Generation of Correction Information (S104)

The correction information 2 is obtained by calculating a correction coefficient at which the variation in brightness of the elemental map in FIG. 5 is eliminated. The correction coefficient is generated for each pixel of a correction channel image based on a brightness value of the pixel in each of the plurality of correction channel images. For example, the correction coefficient is a coefficient in which a value obtained by multiplying the brightness value of a pixel constituting a correction channel image by the coefficient becomes constant. For example, a correction coefficient $C(x,y,ch)$ can be obtained by equation (1) below.

$$C(x, y, ch) = \frac{E(ch)}{A_{ch}(x, y, ch)} \quad (1)$$

As used herein, E(n) denotes an average value of all pixels constituting a correction channel image of channel n (n=−3, −2, −1, 0, +1, +2, +3). In this manner, the correction coefficient can be calculated by dividing an average value of brightness values of all pixels constituting a correction channel image by each brightness value of all pixels constituting the correction channel image.

It should be noted that an average value of brightness values of pixels constituting a center portion of a correction channel image can be used as the average value E(ch). Accordingly, pixels constituting an outer peripheral portion of the correction channel image can be excluded from the calculation. Sensitivity of the channeltrons 52 is low in the outer peripheral portion of a correction channel image. Therefore, excluding the pixels constituting the outer peripheral portion of a correction channel image from the calculation enables a correction coefficient to be obtained with greater accuracy.

Figure 6:
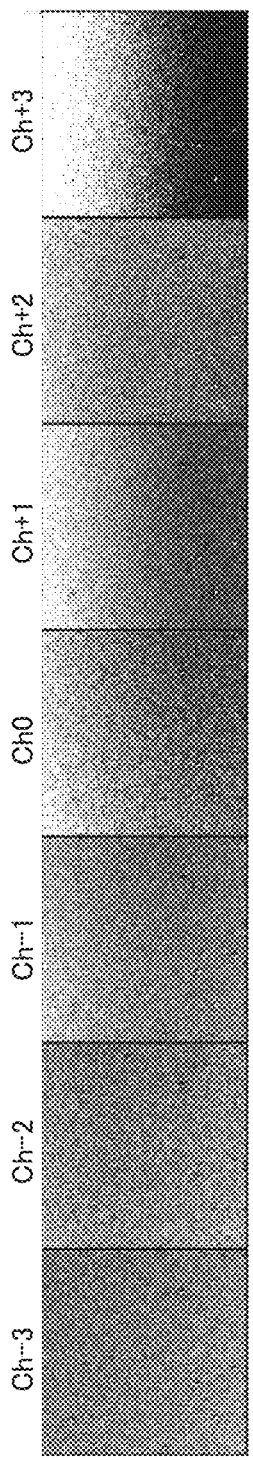
FIG. 6 illustrates correction coefficients.

FIG. 6 illustrates correction coefficients calculated by using the equation (1) described above from the correction channel images in FIG. 5. The generated correction coefficients are stored in the storage unit 84 as the correction information 2.

2.2. Measurement of Specimen to be Analyzed (S20)

A measurement of a specimen to be analyzed is performed. The measurement of the specimen to be analyzed is performed by PB simultaneous measurement.

2.3. Acquisition of Channel Image (S30)

By measuring the specimen to be analyzed, in the processing unit 70, a channel image is generated for each channeltron 52. Accordingly, the processing unit 70 (the image processing unit 74) can acquire seven analysis channel images.

Figure 7:
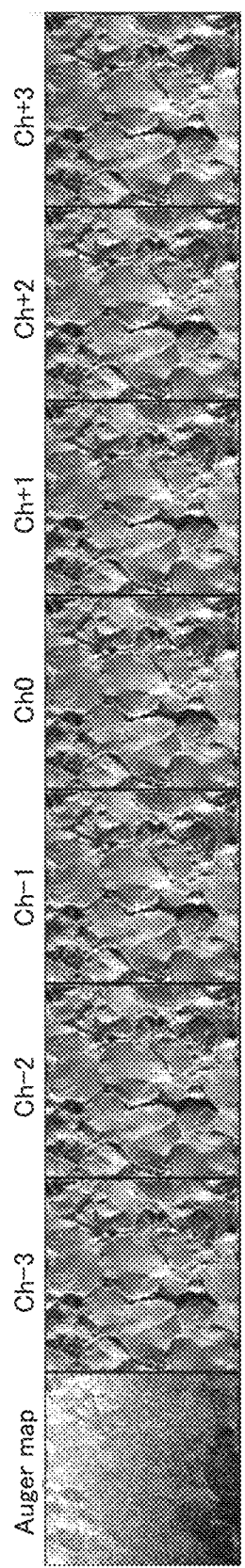
FIG. 7 illustrates analysis channel images and an elemental map obtained by measuring a specimen to be analyzed.

FIG. 7 illustrates analysis channel images and an elemental map (an Auger map) obtained by measuring a specimen to be analyzed. The analysis channel images in FIG. 7 are images obtained by PB simultaneous measurement.

As illustrated in FIG. 7, variations in brightness due to an effect of the positional dependence of the sensitivity of the detector 50 and an effect of the individual difference among the plurality of channeltrons 52 are observed on an elemental map generated from the analysis channel images.

2.4. Correction of Channel Image (S40)

A brightness value of a pixel constituting an analysis channel image is corrected based on the correction information 2 (the correction coefficients in FIG. 6).

For example, a brightness value $A_{ch\_mod}(x,y,ch)$ of a pixel constituting a channel image after correction is calculated by equation (2) below.

$$A_{ch\_mod}(x,y,ch)=C(x,y,ch)\times A_{ch}(x,y,ch) \quad (2)$$

Figure 8:
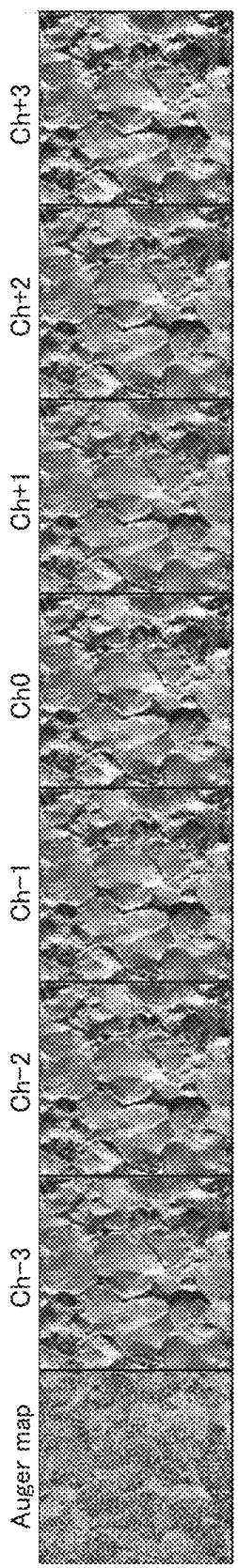
FIG. 8 illustrates analysis channel images after correction and an elemental map after correction.

FIG. 8 illustrates analysis channel images after correction and an elemental map (an Auger map) after correction obtained by correcting the analysis channel images in FIG. 7 by using the correction coefficients in FIG. 6. A brightness value of a pixel constituting the analysis channel images after correction in FIG. 8 is obtained by correcting a brightness value of a pixel constituting the analysis channel images in FIG. 7 by using the equation (2) described above.

2.5. Generation of Elemental Map (S50)

An elemental map (an Auger map) of the specimen to be analyzed is generated based on the analysis channel images after correction in FIG. 8.

A brightness value $A_{map\_mod}(x,y,ch)$ of a pixel constituting an elemental map is represented by the following equation.

$$A_{map\_mod}(x,y)=F(A_{ch\_mod}(x,y,-3),A_{ch\_mod}(x,y,-2),$$
$$A_{ch\_mod}(x,y,-1),$$

$$A_{ch\_mod}(x,y,0),A_{ch\_mod}(x,y,+1),A_{ch\_mod}(x,y,+2),A_{ch\_mod}(x,y,+3))$$

A comparison of the elemental map (the Auger map) prior to correction in FIG. 7 and the elemental map (the Auger map) after the correction in FIG. 8 reveals that a variation in brightness is reduced in the corrected elemental map.

An elemental map can be generated by the steps described above.

For example, the method of generating an elemental map according to the embodiment described above has the following features.

The method of generating an elemental map according to the embodiment described above includes the steps of: acquiring a plurality of correction channel images by scanning a surface of a standard specimen having a uniform elemental concentration with an electron beam and generating the correction channel image for each channeltron 52; and generating correction information 2 for each pixel of each correction channel image among the plurality of correction channel images based on a brightness value of the pixel. Therefore, the correction information 2 for correcting a positional dependence of the sensitivity of the detector 50 can be generated.

Furthermore, the method of generating an elemental map according to the embodiment described above includes the steps of: acquiring a plurality of analysis channel images by scanning a surface of a specimen to be analyzed with an electron beam and generating the analysis channel image for each channeltron 52; correcting brightness values of pixels constituting an analysis channel image among the plurality of analysis channel images based on the correction information 2; and generating the elemental map of the specimen to be analyzed based on the plurality of analysis channel images having the pixels with corrected brightness values. Therefore, an elemental map in which a variation in brightness attributable to the positional dependence of the sensitivity of the detector 50 has been reduced can be generated. Accordingly, for example, even in a case where PB simultaneous measurement is performed at low magnification where the positional dependence has a significant impact, a variation in brightness attributable to the positional dependence can be reduced in the elemental map.

In the method of generating an elemental map according to the embodiment described above, in the step of generating the correction information 2, a coefficient is used as the correction information 2 in which a value obtained by multiplying a brightness value of a pixel constituting a correction channel image by the coefficient becomes constant. Therefore, the correction information 2 for correcting the positional dependence of the sensitivity of the detector 50 can be generated.

In the method of generating an elemental map according to the embodiment described above, the correction coefficient is calculated by dividing an average value of brightness values of all pixels constituting a correction channel image by each brightness value of all pixels constituting the correction channel image. Therefore, the correction information 2 for correcting the positional dependence of the sensitivity of the detector 50 can be generated.

3. Processes

Next, processes performed by the image processing unit 74 will be described.

The image processing unit 74 performs a process of acquiring an elemental map. Specifically, first, the image processing unit 74 acquires a plurality of analysis channel images in FIG. 7 obtained by scanning a surface of the specimen S with the electron beam.

Next, in each of the plurality of analysis channel images, the image processing unit 74 corrects a brightness value of a pixel constituting the analysis channel image based on the correction information 2 for correcting the positional dependence of the sensitivity of the detector 50 or, in other words, the correction coefficients in FIG. 6. In other words, the image processing unit 74 performs the process of "2.4. Correction of channel image (S40)" described above. As a result, the corrected channel images in FIG. 8 are obtained. In the present process, the image processing unit 74 acquires the correction information 2 by reading the correction information 2 from the storage unit 84.

Next, the image processing unit 74 generates an elemental map based on the plurality of corrected analysis channel images. In other words, the image processing unit 74 performs the process of "2.5. Generation of elemental map (S50)" described above. Accordingly, the elemental map (the Auger map) in FIG. 8 can be generated.

For example, the surface analyzer 100 has the following features.

In the surface analyzer 100, the image processing unit 74 performs the processes of: acquiring a plurality of analysis channel images obtained by scanning a surface of a specimen to be analyzed with an electron beam; correcting, in each of the plurality of channel images, a brightness value of a pixel constituting the channel image based on the correction information 2 for correcting a positional dependence of sensitivity of the detector 50; and generating an elemental map based on the plurality of corrected analysis channel images. Therefore, in the surface analyzer 100, an elemental map in which a variation in brightness attributable to the positional dependence of the sensitivity of the detector 50 has been reduced can be generated.

In the surface analyzer 100, in each of a plurality of correction channel images acquired by scanning a surface of a standard specimen having a uniform elemental concentration with an electron beam, the correction information is generated for each pixel of the correction channel image based on a brightness value of the pixel. Therefore, in the surface analyzer 100, an elemental map in which the positional dependence of the sensitivity of the detector 50 has been corrected can be generated.

4. Modifications

The invention is not limited to the embodiments described above, and various modifications and variations can be made without departing from the scope of the invention.

4.1. First Modification

The sensitivity of the detector 50 is affected by, for example, a working distance, a measurement magnification, a resolution of an elemental map, a tilt angle of the specimen stage 30, measurement energy of the spectrometer 40, pass energy of the spectrometer 40, voltage applied to the channeltrons 52, a mechanical axis of the spectrometer 40, and the like. Therefore, the correction information 2 is sequentially acquired while varying these measurement conditions.

For example, in the step of acquiring a plurality of correction channel images or, in other words, in steps S100 and S102 in FIG. 4, a plurality of correction channel images are acquired while varying measurement conditions. In addition, in the step of generating the correction information 2 or, in other words, in step S104 in FIG. 4, correction information is generated for each measurement condition. Furthermore, in the step of correcting a brightness value of a pixel constituting an analysis channel image or, in other words, in step S40 in FIG. 2, correction of an analysis channel image is performed by using the correction information 2 in accordance with the measurement condition.

In this manner, according to the first modification, since correction in accordance with measurement conditions can be performed, the sensitivity of the detector 50 can be corrected with greater accuracy.

When the correction information 2 of a same measurement condition is not stored in the storage unit 84 in the step of correcting a brightness value of a pixel constituting an analysis channel image, correction may be performed by newly generating the correction information 2 by, for example, interpolation from the correction information 2 stored in the storage unit 84. Alternatively, correction may be performed by generating the correction information 2 by newly measuring the standard specimen under a same measurement condition. Alternatively, when the correction information 2 of a same measurement condition is not stored in the storage unit 84, correction may not be performed.

4.2. Second Modification

A sensitivity gradient derived from the positional dependence of the detector 50 is often extremely gradual in comparison to the resolution of an elemental map or, in other words, a size of a pixel. Therefore, in the second modification, a smoothing process is performed on a correction channel image and correction information is generated for each pixel of the smoothed correction channel image based on a brightness value of the pixel.

Figure 9:
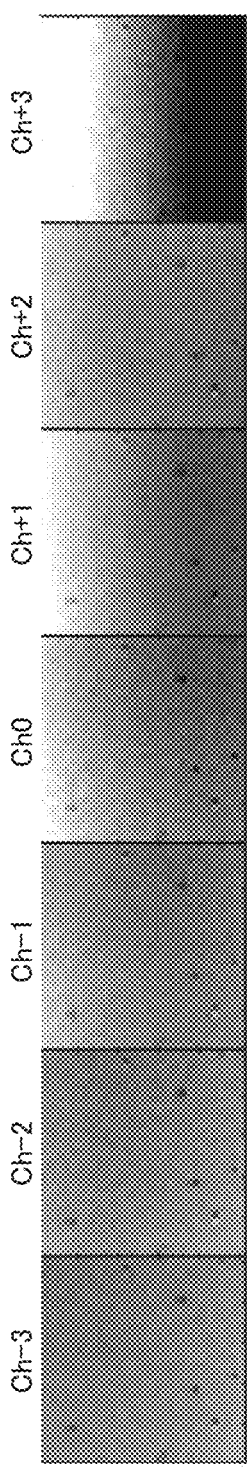
FIG. 9 illustrates correction coefficients calculated by using correction channel images having been subjected to a smoothing process.
Figure 10:
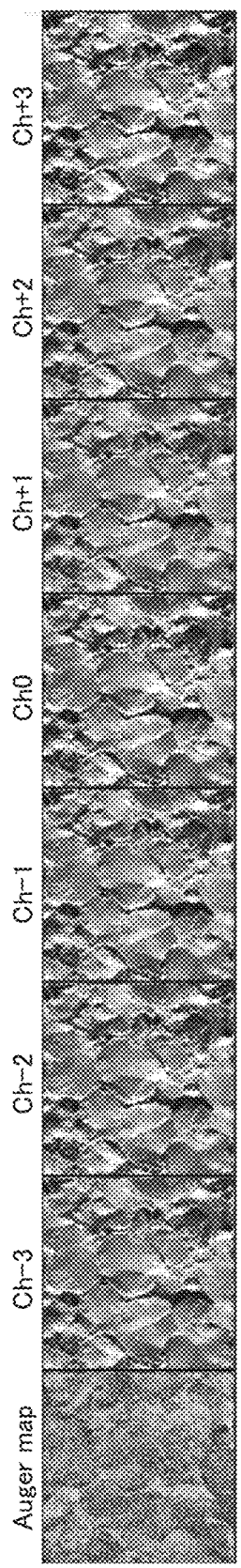
FIG. 10 illustrates analysis channel images and an elemental map both corrected by using correction coefficients calculated by using correction channel images having been subjected to a smoothing process.
Figure 11:
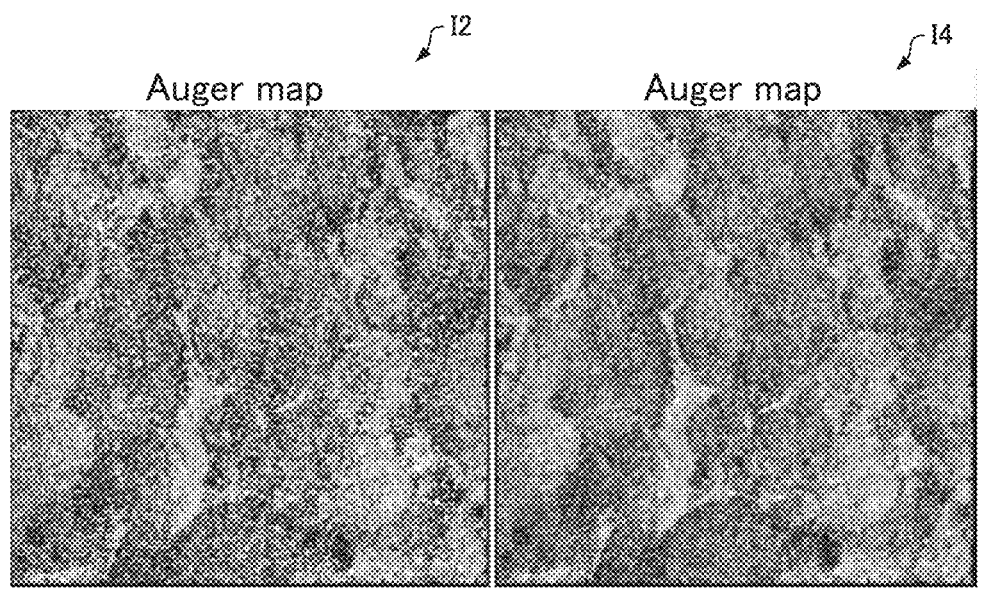
FIG. 11 illustrates the elemental map in FIG. 8 and the elemental map in FIG. 10 for comparison.

FIG. 9 illustrates correction coefficients calculated by using correction channel images having been subjected to a smoothing process. FIG. 10 illustrates analysis channel images and an elemental map (an Auger map), both having been corrected by using the correction coefficients in FIG. 9. FIG. 11 illustrates an elemental map 12 in FIG. 8 and an elemental map 14 in FIG. 10 for comparison.

By performing a smoothing process on correction channel images, as illustrated in FIG. 11, noise of an elemental map is reduced as compared to a case where a smoothing process is not performed on the correction channel images.

4.3. Third Modification

While a case where a measurement of a standard specimen and a measurement of a specimen to be analyzed are performed by PB simultaneous measurement has been explained in the embodiments described above, a measurement of a standard specimen and a measurement of a specimen to be analyzed may be performed by PB separate measurement. Even when the measurements are performed by PB separate measurement, the positional dependence of the sensitivity of the detector 50 can be corrected. Even when a measurement of a standard specimen and a measurement of a specimen to be analyzed are performed by PB separate measurement, an elemental map can be generated by a method similar to the method of generating an elemental map illustrated in FIG. 3 described above.

4.4. Fourth Modification

While a case where the surface analyzer 100 is an Auger electron microscope which uses an electron beam as a primary beam to irradiate a specimen and in which secondary signals emitted from the specimen are Auger electrons has been explained in the embodiments described above, the surface analyzer according to the invention is not limited thereto. For example, the surface analyzer according to the invention may be an X-ray photoelectron spectroscope which uses X-rays as a primary beam and in which secondary signals emitted from the specimen are photoelectrons. Even in this case, a similar working effect to that of the embodiments described above can be produced.

The above-described embodiments and modifications are examples and the invention is not limited thereto. For example, the embodiments and the modifications may be combined appropriately.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

The invention claimed is:

1. A method of generating an elemental map in a surface analyzer which acquires an elemental map by scanning a surface of a specimen with a primary beam, separating signals emitted from the specimen with a spectrometer, and detecting the separated signals with a detector having a plurality of channels capable of detecting the signals having energies that differ from one another, the method of generating the elemental map comprising:
    acquiring a plurality of correction channel images by scanning a surface of a standard specimen having a uniform elemental concentration with the primary beam and generating a correction channel image for each of the channels;
    generating correction information for each pixel of each correction channel image among the plurality of correction channel images based on a brightness value of the pixel;
    acquiring a plurality of analysis channel images by scanning a surface of a specimen to be analyzed with the primary beam and generating an analysis channel image for each of the channels;
    correcting brightness values of pixels constituting an analysis channel image among the plurality of analysis channel images based on the correction information; and
    generating the elemental map of the specimen to be analyzed based on the plurality of analysis channel images having the pixels with corrected brightness values,
    wherein, when generating the correction information, a coefficient is used as the correction information, wherein a value obtained by multiplying each of the brightness values of the pixels constituting the correction channel image by the coefficient becomes constant, and
    wherein the correction information is information for correcting variation in brightness attributable to a positional dependence of sensitivity of the detector.

2. The method of generating an elemental map according to claim 1, wherein
    the coefficient is calculated by dividing an average of the brightness values of all of the pixels constituting the correction channel image by each of the brightness values of all of the pixels constituting the correction channel image.

3. The method of generating an elemental map according to claim 1, wherein
    acquiring the plurality of correction channel images, the plurality of correction channel images are acquired under a plurality of different measurement conditions,
    generating the correction information, the correction information is generated for each of the measurement conditions, and
    correcting the brightness values of the pixels constituting the analysis channel image, correction is performed by using the correction information generated for each of the measurement conditions.

4. The method of generating an elemental map according to claim 1, further comprising:
    performing a smoothing process on each of the plurality of correction channel images after the step of acquiring the plurality of correction channel images, wherein
    generating the correction information, the correction information is generated for each pixel of the smoothed correction channel image based on a brightness value of the pixel.

5. The method of generating an elemental map according to claim 1, wherein
    the primary beam is constituted by electrons, and
    the signals are constituted by Auger electrons.

6. The method of generating an elemental map according to claim 1, wherein
    the primary beam is constituted by X-rays, and
    the signals are constituted by photoelectrons.

7. A surface analyzer comprising:
    a scanning unit which scans a surface of a specimen with a primary beam;
    a spectrometer which separates signals emitted from the specimen;
    a detector which detects the signals separated by the spectrometer with a plurality of channels capable of detecting the signals having energies that differ from one another; and
    an image processing unit which generates an elemental map,
    the image processing unit performing processes of:
        acquiring a plurality of analysis channel images obtained by scanning a surface of a specimen to be analyzed with the primary beam;
        correcting brightness values of pixels constituting an analysis channel image among the plurality of analysis channel images based on correction information which corrects a positional dependence of sensitivity of the detector; and
        generating the elemental map of the specimen to be analyzed based on the plurality of analysis channel images having the pixels with corrected brightness values,
    wherein a coefficient is used as the correction information and a value obtained by multiplying brightness values of pixels constituting one of a plurality of correction channel images by the coefficient becomes constant, and
    wherein the correction information is information for correcting variation in brightness attributable to the positional dependence of the sensitivity of the detector.

8. The surface analyzer according to claim 7, wherein
    the plurality of correction channel images are acquired by scanning a surface of a standard specimen having a uniform elemental concentration with the primary beam, and the correction information is generated in each correction channel image of the plurality of correction channel images for each pixel of the correction channel image based on a brightness value of the pixel.

* * * * *